Nov. 18, 1969 T. A. McLAUCHLAN ET AL 3,479,097
FLUID GUIDE MEANS
Filed Dec. 27, 1966 2 Sheets-Sheet 1
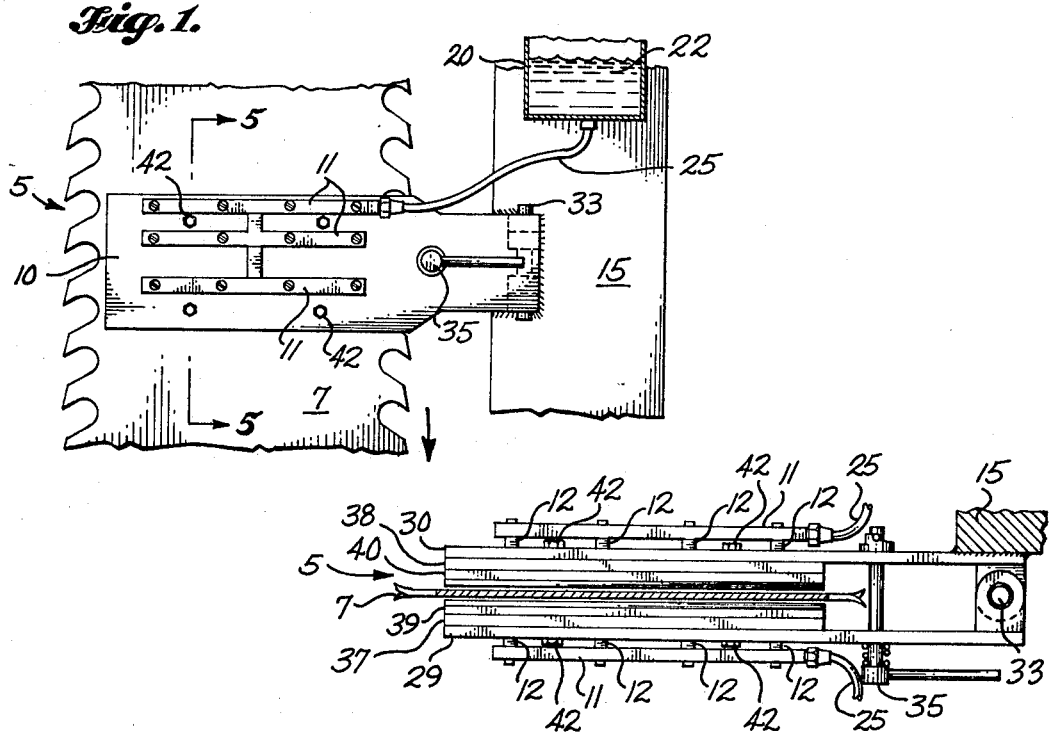
Fig. 1.
Fig. 2.
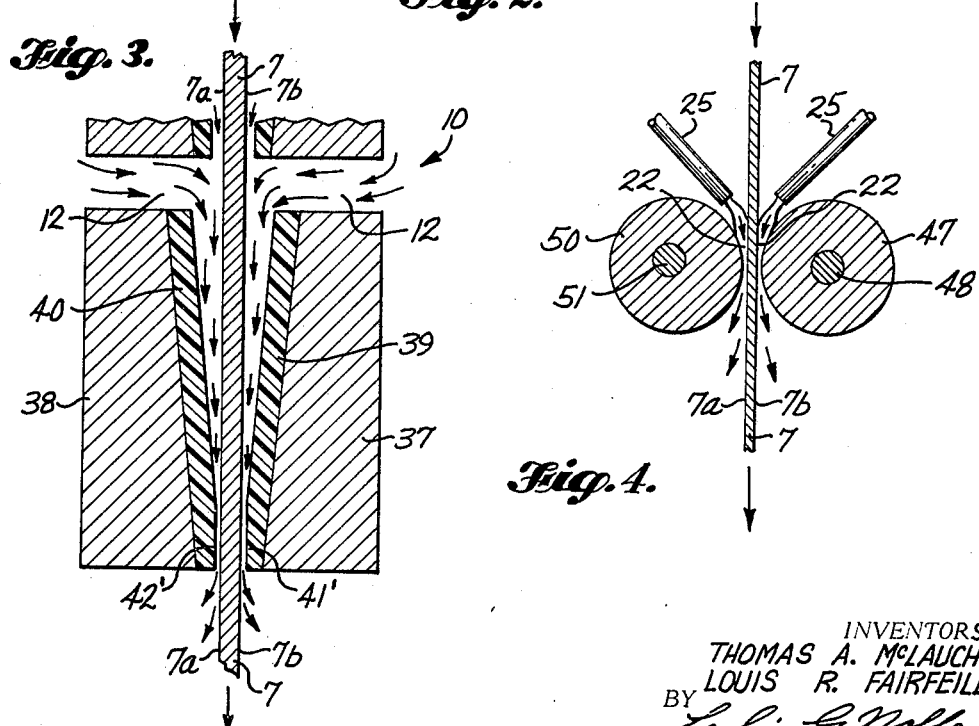
Fig. 3.
Fig. 4.
INVENTORS
THOMAS A. McLAUCHLAN
LOUIS R. FAIRFEILD JR.
BY
ATTORNEYS INVENTORS
THOMAS A. McLAUCHLAN
LOUIS R. FAIRFEILD JR.
ATTORNEYS

United States Patent Office 3,479,097
Patented Nov. 18, 1969

3,479,097
FLUID GUIDE MEANS
Thomas A. McLauchlan and Louis R. Fairfield, Jr., Longview, Wash., assignors to Weyerhaeuser Company, Tacoma, Wash., a corporation of Washington
Filed Dec. 27, 1966, Ser. No. 604,724
Int. Cl. F16c *1/24, 33/10;* B26d *1/54*
U.S. Cl. 308—5                        6 Claims

ABSTRACT OF THE DISCLOSURE

Disclosed is a means for guiding moving planar surfaces such as circular or band saws. Sloping guiding surfaces are positioned opposite surfaces of the moving band to form guiding regions. The friction of the moving band forces a fluid which is supplied to the guiding region into the decreasing area between the surfaces and thereby increases the fluid pressure with a maximum being reached at the point of minimum clearance. The fluid dampens band vibration and imposes centering forces on the band to guide it without mechanical contact with the guide.

Background of the invention

The present invention relates to a means for guiding moving objects having planar surfaces and, more particularly, to a fluid guide means for guiding and dampening vibrations in circular or band saws.

In the operation of high speed manufacturing equipment where intermittent loads are applied to moving tools having planar surfaces, the imposition of the working and driving loads causes vibrations in the equipment. If accuracy is a requirement for the useful operation of the equipment, guide means are often used imposing additional vibrations into the moving object, as well as requiring an additional driving force to overcome the friction caused by the guide means. These operating conditions are typically found in circular and band saw equipment such as that used for cutting lumber products. The instant invention is directed to an improvement in such equipment and particularly to an improvement in the guide means to increase cutting accuracy and to reduce vibration without inducing significant working loads on the sawing equipment.

Band saw guiding equipment is old and well known, as indicated by the U.S. patent to Mater—No. 3,158,184. As disclosed, the Mater guide assembly 142, 143 is provided with suitable pads for engaging the inner surface of the band saw blade above and below the cutting zone to dampen vibrations. Another type of contacting band saw, more suitable for smaller band saws, is disclosed in the U.S. patent to Burkey—No. 3,220,446. As shown, several circular guide wheels are positioned above and below the cutting station of the saw to provide end and side guidance to the blade. It should be noted that with the Mater and Burkey type guides, direct mechanical contact between the guide and the moving saw blade is a common characteristic. Such contact induces load forces, heats up the blade, and eventually causes both the guide and the blade to be replaced due to wear.

Another example of a direct mechanical contact guide is that shown in the two U.S. patents to Robinson—No. 3,104,575 and No. 3,104,576. In this type of guide, mechanical contact is established between the guide means and the moving band saw blade, but the frictional heat is substantially dissipated by means of the coolant fluid which is directed against the blade at the guide means. This coolant may also have an additional function of flushing metal chips away from the blades of the saw.

Still another type of band saw guide has been disclosed in the U.S. patent to Dunn et al.—No. 3,225,801, wherein air jets are directed on opposite sides of the thin lightweight band to impose a substantially equal and opposite force on either side of the band to guide its path of travel. With such a jet guiding system, it is possible to guide the band without high frictional loads being imposed by the guide means, which loads are typical of the previously discussed guide means. While the Dunn et al guide means is useful for guiding relatively slow (less than 500 ft./min.) lightweight bands of 0.012 in. thickness or less, a similar jet system for guiding high speed (above 5,000 ft./min.) heavy bands of up to 0.125 in. thickness, typically used in the lumber industry, would require large, high-pressure generating sources and would probably be too expensive to justify its use. It is also noted that the Dunn et al guide means is dependent upon an external pressure source to provide the high-pressure air and pressure regulating functions necessary for its operation.

Summary of the invention

It is therefore the object of the instant invention to provide an improved guide means for substantially eliminating the vibration and for accurately guiding moving planar objects without mechanically contacting such objects and without being dependent upon an external pressure regulating and pressure supplying source.

It is a further object of the instant invention to provide an improved guide means for high speed heavy band saw blades which substantially eliminate blade vibration while at the same time reduce blade wear and increase cutting accuracy and surface smoothness in the material being cut.

It is a still further object of the instant invention to provide an improved guide means for high-speed heavy band saws which, when installed on existing band saw equipment, increases the cutting speed of such equipment while substantially reducing the incidence of replacement and repair of the saw blades used.

It is another object of the instant invention to provide an improved guide means for high speed heavy band saws which significantly lowers the noise level of the operation of such saws by substantially eliminating the band vibrations.

It is yet another object of the instant invention to provide a method of providing a fluid guiding force of substantially equal and opposite magnitude on either side of a moving planar object.

The instant invention provides at least one pair of opposingly positioned wedge-shaped guide shoes on opposite sides of a moving planar object. These shoes are situated so that their surfaces present a V relationship with the planar object traveling through the V and out of the apex. A relatively incompressible fluid, such as water, is introduced into the cavity created between the planar surfaces and the surfaces of the shoes. The pumping action of the moving planar surface causes a marked pressure differential from the top to the bottom within this cavity. A high pressure is developed at the apex of the V at the point where the planar surface exits from the guide shoes. This pressure is effective in resisting sideward thrust of the planar surface, since the forces which tend to move the planar object sideways are opposed by the resulting increase of the fluid pressure on the side where the cavity is reduced in size. This tends to resist the sideward thrust and thus stabilizes the position of the planar object.

Other and further objects, features and advantages of the present invention will become apparent to those skilled in the art from the following detailed disclosure thereof and the drawing attached hereto and made a part hereof.

Brief description of the drawing

In the drawing:

FIGURE 1 is a schematic side elevation view of a portion of a band saw utilizing the guide means of the instant invention;

FIGURE 2 is a top plan view of the guide means shown in FIGURE 1;

FIGURE 3 is a schematic end elevation view of one embodiment of the guide means of the instant invention;

FIGURE 4 is a schematic end elevation view of a second embodiment of the guide means of the instant invention.

Description of the preferred embodiments

Figure 5:
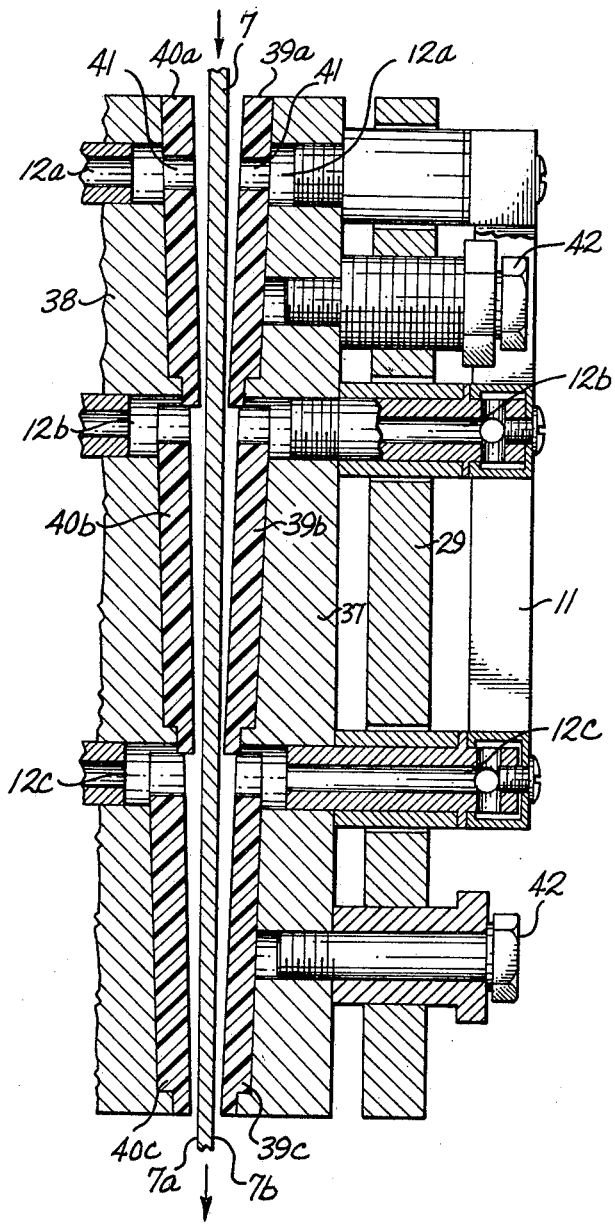
FIGURE 5 is a section view taken from the position indicated at 5—5 of FIGURE 1 showing details of the guide means.

In FIGURE 1, reference numeral 5 generally refers to the saw guide assembly, which is mounted on opposite sides of the path of the band saw blade 7 as it moves in the direction indicated by the arrow. This arrangement is typical of band saw guide installations such as shown in the aforementioned patent to Mater. The guide 10 is positioned on either side of the saw 7 and includes fluid manifolds 11, which are connected by conduit 25 to a fluid supply tank 20 or other suitable source for the fluid 22. As shown, the guide 10 is supported by support frame 15 in a conventional manner.

A different view of the guide assembly 5 is illustrated in FIGURE 2, which shows a top view of the guide 10 including frame support arms 29, 30 positioned on opposite sides of the saw blade 7. The frame support arms 29, 30 may be pivotally joined by means of support pivot pin 33 and secured to the support frame 15 to permit the guide to be opened for inspection and part replacement. As a safety feature, the frame support arms 29, 30 are held together by means of a spring-loaded safety bolt 35, which permits their displacement one from another if an abnormally large band deflection occurs. Attached to the frame support arms 29, 30 are backer plates 37, 38, which in turn support easily replaceable guide shoes 39, 40.

FIGURE 3 is now referred to, since it shows an end elevation view of one portion of the working elements of the guide means 10 and better illustrates its operation. As shown, the guide shoes 39, 40 are attached to the backer plates 37, 38. This can be done by means of a mechanical attachment such as screws or by an adhesive which bonds at normal temperatures but releases the shoes at elevated temperatures for easy replacement. The surfaces of the guide shoes 39, 40 closest to the surfaces 7a, 7b of the saw band 7 form a wedge or V with the saw blade passing through the apex of the V. The guide shoes may terminate at their lower end in parallel lands 41', 42'. The fluid, such as water 22, comes in through the fluid passageway 12 and is directed by the frictional engagement with the moving surfaces 7a, 7b of the band 7 down to the more constricted areas formed by the shoes 39, 40.

This pumping action of the band 7 causes the fluid pressure to increase as the fluid is forced into the more constricted area, with the maximum pressures developing in the region where the clearance is the minimum between the surfaces 7a, 7b and the surfaces of the guide shoes 39, 40. These pressures force the band 7 toward a position substantially equidistant from the surfaces of the shoes 39, 40. If a force is applied to the band 7 which causes it to be deflected toward the guide shoe 40, the area between the guide shoe 40 and the surface 7a of the band 7 becomes more constricted, and the pressure increases on the left side of the band, forcing the band back over toward the right toward the center of the guide. Thus, it is seen that the band is forced to maintain an equilibrium position between the guide shoes 39, 40 without actual mechanical engagement with the shoes 39, 40. The cooperating effect between the moving band 7 and the stationary wedge-shaped shoes 39, 40 results in a pumping function for increasing the fluid pressure between the shoes and the band, and thus the guide operates without being dependent upon any external pressure source. The angle of the slope of the guide shoe surfaces relative to the plane of the saw blade may be any angle greater than 0° but less than 15°.

To make more clear the concept involved in the instant guide, a second embodiment of the guide assembly 45 is shown in FIGURE 4. In a similar manner wtih the first embodiment 5, the band 7 moves in the direction shown by the arrow, relative to the circular guide shoe 47 and to the eccentric guide shoe 50. Guide shoe 47 is supported on support shaft 48, and guide shoe 50 is supported on support shaft 51. As shown, conduits 25 introduce liquid 22 into the constricted area formed between the surfaces of the guide shoes 47, 50 and the surfaces 7a, 7b of the band 7. The pressure of the liquid 22 is increased due to the pumping action of the band 7 and decreasing area between the guide shoes 47, 50. The shafts 48 and 51 can be counterbalanced or sprung-wound, so that as an unusually large band deflection occurs, the guide shoes may be displaced outwardly without causing an actual fracture of the band 7 or of guide assembly 45. Both guides could be circular or eccentric, and this embodiment is disclosed for illustrative purposes only.

The preferred embodiment of the instant guide means 5 is shown in greater detail in FIGURE 5, which is a section view through lines 5—5 of FIGURE 1. It is noted that the guide consists of three sets of guide shoes 39a–40a; 39b–40b; and 39c–40c. The guide shoes 39a, 40a are somewhat different in design than guide shoes 39b, 40b, in that guide shoe opening 41 is provided as a connection between the fluid passageway 12 and the constricted chamber formed between the surfaces of guide shoes 39a, 40a and the surfaces 7a, 7b of the band 7.

A simple four-point adjustment is provided for each of the backer plates 37, 38 by means of the adjusting bolts 42, which are mounted on the frame support arms 29, 30. Minor adjustments in the positioning of the shoes can be made by means of the adjusting bolts 42 without having to take the equipment apart.

In operation, it has been found that for a 10 in. wide double-cut saw blade, such as blade 7 shown in FIGURE 1, having a thickness of 0.12 in., a force of approximately 100 to 200 lbs. is necessary to guide the band in its travel. In a test guide, similar in construction to that shown in FIGURE 5, a 55 sq. in. surface of guide shoes was provided on each side of the band, and water was used as the relatively incompressible fluid to guide a double-cut saw blade operating at aproximately 10,000 ft./min. The angle of the surface of the guide shoes 39, 40 relative to the surfaces 7a, 7b of the band 7 was between 0.5 and 3°. The minimum clearance between the surfaces of the shoes 39, 40 and the surfaces 7a, 7b was 0.004 in. Such a clearance provides an adequate amount of guidance while still permitting passage of welds, which are used to join the ends of the saw into one continuous band. The wear rate experienced with this test guide was found to be in the range between 0.001 and 0.002 in. per forty hours of operation.

The minimum clearance between the band saw surface and the surfaces of the guide shoes may be reduced lower than 0.004 in. if the size of surface irregularities in the band is of a nature to permit smaller clearances. A practical maximum clearance is approximately 0.014 in. for a saw operating at 10,000 ft./min. with water being used as the guiding fluid. Excessive clearances do not develop sufficient pressures to stabilize the band. The operation of the guide is dependent upon maintaining a continuous film of water flowing through the cavity between the guide shoes and the band. In addition, increased wear of the guide shoes of 0.003 in./hr. was experienced when the guide clearance was increased to 0.018 in.

In a conventional band saw guide lignum vitae wood blocks are held in a guide similar to that shown in the patent to Mater previously referred to. On one saw studied, such guides normally allowed an average deflection of 0.250 in. with a maximum deflection of 0.375 in. With the guide of the instant invention no deflection was observed during tests to exceed 0.12 in. on either side of the normal position. A substantial reduction of the noise level was also observed, when the guide of the instant invention was tested, as compared to conventional guides.

The type of material used for the guide shoes is not critical, since the band, during normal operations, will not be in contact with the guide shoes. Test installations have utilized brass and nylon impregnated with molybdenum disulfide as guide shoes material with satisfactory results.

The service life of the bands is significantly improved, due to the elimination of actual mechanical contact between the guide means and the band. Often, cracks are caused by the vibrational fatigue and both tensile and thermal stresses due to extreme cutting loads. However, the instant improved guide substantially reduces these cracks by reducing the vibration levels and improving the cooling of the band.

Several advantages have been obtained by utilizing the improved guide means of the instant invention. Cutting accuracy has been improved, since the saw is held rigidly in the cutting plane, and deviations from the cutting line are greatly reduced. In the case of a double-cut saw, such as that shown in FIGURE 1, the accuracy and speed of operation are significantly improved, since the typical large vibrations induced in the band at the end of a cut are now dampened quickly by the fluid guide, permitting immediate entry into the return cut without a large deviation of the line of cut. It has also been found that improved surface finishes are obtained when the instant guide is utilized, since the band vibrations are effectively reduced.

One of the more subtle advantages of the instant improved guide is that of reducing the kerf or width of cut, as the result of vibration elimination and reduced roughness of the cut surface. Further, the line of cut is more accurate. Since heavier blades were previously used to dampen vibrations and provide stability, such problems are now solved by the guide and thinner gauge blades may now be used for cutting the same size of wood. Additional kerf reduction is thus realized by the use of these thinner bands.

Even without the advantages of more accurate cutting, which results from the elimination of vibration, the improved guide easily pays for itself by increasing the life of the band and reducing the band maintenance. Previously, many band cracks were attributed to material failure in the band caused by cyclic flection (vibration) of the band while it was under tension. Metal fatigue is often the result of the vibrations at the end of the cut caused by the engagement of the back edge of the band with the log during the carriage return on a single-cut saw. Minimizing these vibration sources eliminates these causes of cracks and the resulting welding and maintenance requirements. Band life is, of course, also increased by improved cooling and lubricating which result from maintaining a continuous film of the guiding fluid across the entire band width.

Since mechanical contact between the guide and band, and its associated wear, has been eliminated by the instant fluid-bearing guide, guide shoe maintenance has been dramatically reduced. The only maintenance involved with the instant guide is simple replacement of the guide shoes, which is not required in most installations any more frequently than once per quarter annual period.

Thus, it is seen that we have disclosed an improved guide means which substantially eliminates band saw vibration, increases band life and cutting accuracy, and overcomes the heating problems caused by previously used mechanical contacting guides.

Having described our invention, what we claim as new and desired to secure by Letters Patent is:

1. Guide means for a moving object, comprising:
   support means, guide shoe means, relatively incompressible fluid supply means, conduit means, and said object in combination;
   said object including planar surfaces moving relative to said support means;
   said guide shoe means supported by said support means and positioned to form an opening on opposite sides of said planar surfaces through which at least a portion of said object passes;
   said shoe means defining surface means which slope toward said planar surfaces, providing a decreasing clearance between said surfaces in the direction said object moves relative to said support; and
   said conduit means providing a connection between said fluid supply and a portion of said guide shoe means having a greater clearance from said object permitting the movement of said object to increase the pressure of said incompressible fluid as it is forced by said object into a portion of said guide shoe having the minimum of clearance from said object.

2. The guide means of claim 1 wherein said slope is greater than 0° but less than 15°.

3. The guide means of claim 1 wherein:
   the minimum clearance between said planar surface and said shoe surface means is 0.004 in.

4. The method of guiding a planar object in a desired path, comprising:
   establishing at least one pair of opposed sloping surfaces adjacent said path on opposite sides of said planar object to form an apex of a V with the moving object passing from the large part of the V toward the apex; and
   supplying an adequate quantity of a relatively incompressible liquid into the cavity formed on either side of the planar surfaces between the planar surfaces and the sloping guiding surfaces to maintain a constant film between the sloping surfaces moving said planar object at a speed sufficient to create a pressure differential along said slopping surfaces, the pressure of said liquid increasing toward said apex and the planar surfaces.

5. The method of claim 4 wherein:
   said fluid is water.

6. The guide means of claim 1 wherein:
   said relatively incompressible fluid is water.

References Cited

UNITED STATES PATENTS

| | | | |
|---|---|---|---|
| 2,060,430 | 11/1936 | Spooner | 226—97 |
| 3,030,744 | 4/1962 | Mueller | 308—122 |
| 3,097,971 | 7/1963 | Carlisle. | |
| 3,191,835 | 6/1965 | Fenn | 226—97 |
| 3,225,801 | 12/1965 | Dunn. | |
| 3,230,752 | 1/1966 | Dodson | 226—97 X |

EDGAR W. GEOGHEGAN, Primary Examiner

L. L. JOHNSON, Assistant Examiner

U.S. Cl. X.R.

83—201.15